May 24, 1949.  D. L. LOUGHBOROUGH  2,471,224
MEANS FOR PREVENTING THE ACCUMULATION OF
ICE ON AIRCRAFT SURFACES AND THE LIKE
Filed April 19, 1945
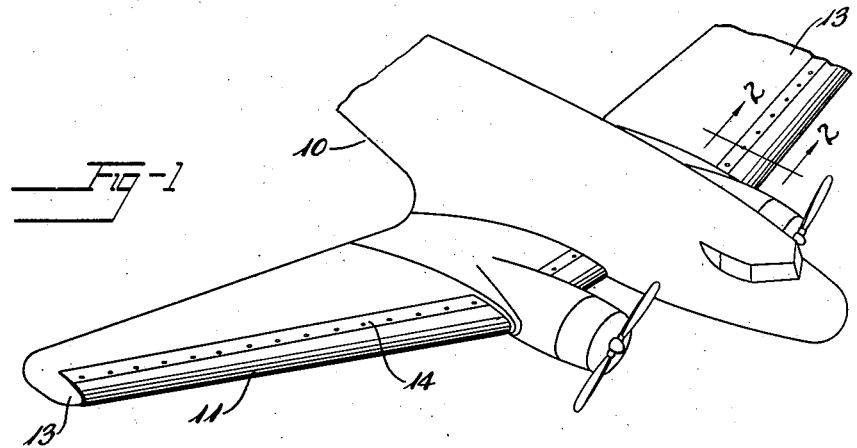
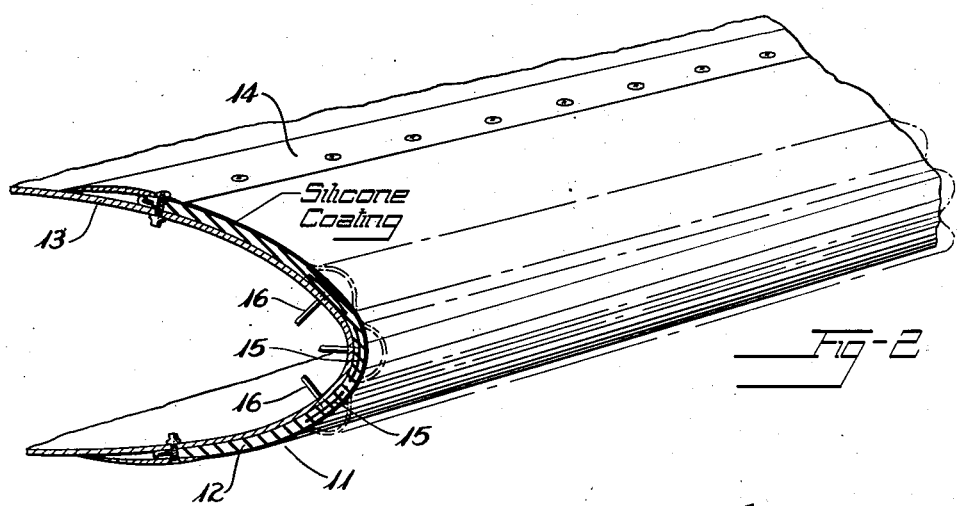
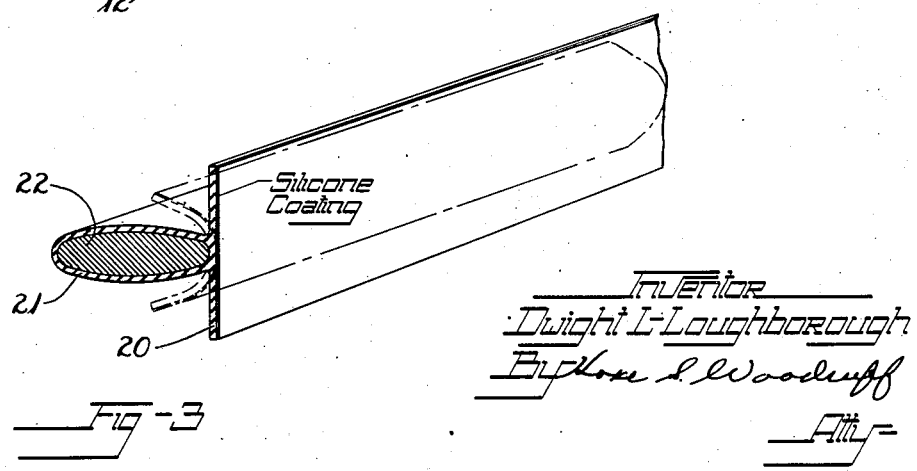
Inventor
Dwight L. Loughborough Patented May 24, 1949

2,471,224

UNITED STATES PATENT OFFICE 2,471,224

MEANS FOR PREVENTING THE ACCUMULATION OF ICE ON AIRCRAFT SURFACES AND THE LIKE

Dwight L. Loughborough, Akron, Ohio, assignor to The B. F. Goodrich Company, New York, N. Y., a corporation of New York Application April 19, 1945, Serial No. 589,124

20 Claims. (Cl. 244—134)

This invention relates to means for preventing the accumulation of ice on surfaces and is especially useful for protecting against the accumulation of dangerous quantities of ice on the leading edges of airfoils and other portions of aircraft in flight.

Winter and high altitude flying involves a serious hazard resulting from accumulation of ice on the leading edges of aircraft wings, control surfaces, struts, propellers and the like. This hazard has been combatted with considerable success by covering the leading edges of airfoils with a flexible sheath, preferably of elastic rubbery material, and periodically distorting the sheath during flight to change its shape and break loose any ice which may have accumulated thereon so that the ice may be swept away by the air stream. In the commercial form of this device sold under the trade-mark "De-Icer," distortion of the rubber sheath is effected by alternately inflating sets of inflatable tubes underlying the sheath so as to effect stretching and shifting of the exposed surface of the sheath. It has also been proposed to effect such distortion of the sheath by various mechanical means including rotating cams, lever mechanisms, reciprocating arms, travelling rollers and the like. Flexible rubber vanes have been mounted on struts for flexing in the wind stream and so breaking loose ice formed thereon. Similarly, rubber discs and sheaths have been mounted on propellers to combat ice formation.

I have found that the effectiveness of such devices in protecting against ice accumulation may be greatly enhanced by providing a surface or film coating of silicone material at the surface exposed to icing conditions. The adhesive bond between the rubbery surface and the ice may thereby be reduced by as much as 90% or more with the result that ice removal in the air stream and under the breaking influence of periodic surface distortions is greatly facilitated.

The silicone materials preferably employed in the invention are the organo-silicon polymers derived from organo-silicon halides and may be produced in situ by treating the rubbery surface of the ice-removal apparatus with an appropriate organo-silicon halide whereupon formation of the silicone occurs spontaneously, or the silicone may be pre-prepared in any of a variety of physical forms and applied as such to the rubbery surface. It is also possible to incorporate the silicone material into the rubbery composition from which the flexible sheath is produced, or even to form the sheath itself from certain types of silicones. Although some variation has been noted in the effectiveness of these various modes of application, all of them are effective to reduce ice adhesion to a small fraction of its normal value.

The silicones utilized in the invention as well as the organo-silicon halides from which they are preferably derived, may be obtained from the Dow-Corning Corporation and from The General Electric Company. These materials are described in various literature references including the Corning Glass Works British Patent No. 561,136, "Chemical and Metallurgical Engineering" for August, 1944, at pages 109, 135 and 136, "General Electric Review" for August, 1944, "Modern Plastics" for November, 1944, in the article beginning at page 124 entitled "Silicones-High Polymeric Substances," and "Chemical and Engineering News" for November 25, 1944, at page 2016.

The silicones exist in a variety of physical forms including liquids of varying viscosities, oils, greases, and more or less resilient and elastic solids or elastomers which may be compounded and vulcanized to obtain a product resembling vulcanized rubber in many respects. These various types as well as hard resinous forms of silicones which may be plasticized all are useful in the present invention.

The silicones, or siloxanes as they are sometimes called, are derived from organo-silicon halides by processes understood to involve hydrolysis of the halide followed by polymerization of the resulting silanol (or silicol). It appears that sufficient moisture is normally present at the surface of a rubber product or in the surrounding atmosphere to permit formation of the silicone to occur spontaneously since it has been observed that treatment of the rubbery surface of ice removal apparatus with, for example, vaporous or liquid dimethyl silicon dichloride results in the formation of a tenaciously adhered film over the treated surface. The film is quite flexible and can be stretched repeatedly without breaking so that it is peculiarly adapted for use on inflatable ice removing devices.

Among the organo-silicon halides useful in the invention are the alkyl-silicon halides, the aryl-silicon halides and the mixed alkyl-aryl-silicon halides including but not being limited to the exemplary materials: dimethyl silicon dichloride, diethyl silicon dichloride, dipropyl silicon dichloride, methyl silicon trichloride, methylethyl silicon dichloride, dimethyl silicon dibromide, dilauryl silicon dichloride, diphenyl silicon dichloride, dibenzyl silicon dichloride, dichlorophenyl silicon dichloride, ethyl silicon tribromide, methyl phenyl silicon dibromide, and many others such as are described in the above-mentioned literature references, as well as mixtures of the above with the same or other silicon halides.

Outstanding results have been obtained by treating rubbery surfaces with dimethyl silicon dichloride either alone or in admixture with other similar organo-silicon halides. For example, a mixture understood to contain a minor proportion of monomethyl silicon trichloride and a major proportion of dimethyl silicon dichloride together with a very minor proportion of trimethyl silicon chloride has been used with success.

These organo-silicon halides may be applied to the surfaces to be treated in any manner desired, such as by applying in vapor form, in liquid form or in solution. Excellent results have been obtained by treating a rubbery surface directly with vaporous or liquid dimethyl silicon dichloride. It may be preferred, however, as a practical matter and for economy of application, to apply the materials in the form of solutions of the organo-silicon halides dissolved in volatile solvents. Suitable solvents include hydrocarbons, esters, alcohols, ketones or the like. For best results, it is preferred that hydrocarbon or halogen-substituted hydrocarbon solvents be employed. These latter solvents include benzene, naphtha, carbon tetrachloride and many others of a similar nature.

In a typical example, a 50% solution, by weight, of dimethyl silicon dichloride in benzene was prepared. This solution was brushed onto the surface of a rubber ice removal device of the type sold under the trade-mark "De-Icer" and the solvent was permitted to evaporate, whereupon a tenaciously adherent flexible and stretchable film was produced on the rubber as hereinabove described. Ice was formed on this surface by subjecting it to icing conditions. The adhesion of the ice was only 6.7 lbs./sq. in. When a similar rubber surface was subjected to the same icing conditions but without the surface having been treated as set out above, the adhesion of the ice was found to be 67.5 lbs./sq. in. showing that treatment of the surface with the dimethyl silicon dichloride reduced the adhesion of the ice by about 90%.

As has been indicated, it is also possible to pre-prepare the silicones from suitable initial materials such as the organo-silicon halides hereinabove set out, and to apply the polymeric silicone material to the rubbery surface in liquid, solid or solution form. Also, the silicones may be admixed with the rubbery material itself.

If a liquid polymeric silicone is to be used, the liquid may be applied directly to the surface of the rubbery sheath or it may be compounded into the rubbery composition from which the sheath is made, preferably in an amount of from 1% to 15% based on the weight of the rubbery material. For direct application to the sheath, the liquid may be diluted with one of the solvents hereinabove mentioned if desired, although this is not necessary and the liquid silicone may be applied without dilution.

In a further example of the invention, a liquid polymeric silicone was prepared from a mixture of dimethyl silicon dichloride and monomethyl silicon trichloride containing traces of trimethyl silicon chloride. The liquid silicone, which had an initial boiling point of around 165° C., was applied directly to the surface of the inflatable element of an ice removal apparatus made from vulcanized neoprene. The silicone formed a tough film over the surface, the film being freely elastic and extensible so that it did not break when the rubbery material was stretched upon inflation of the apparatus. When the treated surface was subjected to icing conditions, the resulting ice was found to have an adhesion of only about 11 lbs./sq. in. as compared to an adhesion of 75 lbs./sq. in. on an untreated surface of the same kind.

The greasy types of silicone polymers may be "smeared" over the rubbery surface to provide effective reduction in ice adhesion. Thus, an inflatable ice remover made of vulcanized neoprene was thinly coated by a hand-spreading operation with the sticky, greasy silicone polymer designated commercially as "Dow Elastomer." Adhesion of ice to the treated surface was thereby reduced to about 2.5 lbs./sq. in. as compared with a normal adhesion in the neighborhood of 70 lbs./sq. in. Such a coating also may be applied by first dissolving the silicone grease in a suitable solvent such as benzene.

Similar tests show that adhesion of ice to a surface of the elastic and resilient silicone polymer designated by The General Electric Company as "Silicone Rubber" is less than 10 lbs./sq. in. A preformed film or sheet of such silicone rubber may be adhered or mechanically secured over the rubbery surface of an ice removal apparatus or the silicone rubber may be dissolved in a solvent and applied as a cement coating which upon drying will deposit a film of silicone rubber. Also, the protective sheath itself may be formed entirely of such material by known methods although fabric reinforcements and a rubbery backing generally will be desirable. Like the liquid polymers, the rubbery polymers also may be admixed with natural or synthetic rubbery materials of the character presently used in fabricating ice removing apparatus, all with advantageous effect in reducing adhesion of ice to the surface of products made therefrom.

In utilizing solutions of the various silicones for treating rubber, it will in many cases be found advantageous to include natural or synthetic rubber in the cement solution.

The accompanying drawings illustrate typical applications of the present invention in preventing the accumulation of ice on aircraft surfaces.

Of the drawings:

Fig. 1 is a conventionalized fragmentary perspective view of an aircraft with apparatus for preventing the accumulation of ice in accordance with the present invention mounted on the leading edges of the wings.

Fig. 2 is a sectional perspective view taken along the line 2—2 of Fig. 1 and showing more specifically details of an inflatable type of ice removing apparatus mounted on the aircraft wing.

Fig. 3 is a fragmentary sectional perspective view illustrating a modified type of device for preventing the accumulation of ice on aircraft parts and also embodying the present invention.

Referring to the drawings, the numeral 10 designates a conventional aircraft having inflatable boots 11, 11 of the "De-Icer" type mounted on the leading edges of the wings. For simplicity of illustration, a simplified form of boot has been shown consisting of a rubbery sheath 12 mounted in stretched condition over the leading edge of the wing 13 with the margins of the sheath being secured to the wing by fairing strips 14 suitably riveted or otherwise attached to the wing structure itself. Three inflatable tubes 15, 15 are provided underneath the surface of the sheath and disposed about the nose of the wing in the usual manner. Inflating means, indicated schematically as connecting tubes 16, 16, are provided for conducting inflating fluid to the respective inflatable tubes, the tubes 16 normally being connected to means for supplying and distributing compressed air so as to effect alternate inflation of the central tube and the two outside tubes. A silicone coating, indicated by the legend and shown in exaggerated thickness for clarity of illustration, is provided on the exposed surface of the rubbery sheath in any of the manners hereinabove described for reducing the adhesion of ice thereto.

It is to be understood, of course, that a variety of structures are possible in such an inflatable boot and that only the essentials of a typical installation have here been illustrated.

The inflatable ice removal apparatus may be made of any rubbery elastic material including but not being limited to natural rubber, neoprene, butadiene-styrene copolymers, plasticized polyvinyl chloride, and other synthetic rubbery materials, and may or may not include fabric or other reinforcements as is well understood in the art.

Another form of apparatus for preventing accumulation of ice is shown in Fig. 3, this form being especially adapted for use on airplane struts, wires and the like. This device comprises a flexible sheet or platelike member 20 formed of rubbery material and attached to a sheath 21 of rubber or rubberized fabric which embraces the strut or wire 22 and serves as an anchorage for the sheet 20. In flight, the sheet 20 will flex and vary its shape as the air speed of the airplane varies with the result that ice forming upon its surface will be broken up and dislodged. In accordance with the present invention, the exposed surface of the sheet 20 may be provided with a thin film coating of polymeric silicone, as indicated by the legend, for reducing adhesion of ice thereto. If desired, the entire exposed surface of the device may be similarly coated with silicone material.

Although the invention is particularly useful in connection with ice removal apparatus for aircraft and consequently has been described with particular relation to such use, it will be understood that the principles of the invention may also be applied in connection with other types of articles made of rubbery material which are normally subjected to icing conditions in use such as flexible hose which are to be used in cold atmospheric conditions.

This application is a continuation-in-part of my copending application Serial No. 526,139, filed March 11, 1944, now abandoned.

Numerous modifications and variations in details of the structures, procedures and materials hereinabove described may be effected without departing from the spirit and scope of the invention as defined by the appended claims.

I claim:

1. Apparatus adapted to be associated with an aircraft surface exposed to icing conditions for preventing accumulation of ice thereon, said apparatus comprising flexible elastic means formed of rubbery material arranged to be mounted on said surface and to be distorted for breaking ice therefrom, an exposed surface of said flexible means comprising a silicone, said surface being resistant to the adhesion of ice under said icing conditions.

2. Apparatus adapted to be associated with an aircraft surface exposed to icing conditions for preventing accumulation of ice thereon, said apparatus comprising flexible elastic means formed of rubbery material arranged to be mounted on said surface and to be distorted for breaking ice therefrom, an exposed surface of said flexible means comprising a polymeric product derived from an organo-silicon halide, said surface being resistant to the adhesion of ice under said icing conditions.

3. Apparatus adapted to be associated with an aircraft surface exposed to icing conditions for preventing accumulation of ice thereon, said apparatus comprising flexible elastic means formed of rubbery material arranged to be mounted on said surface and to be distorted for breaking ice therefrom, an exposed surface of said flexible means being treated with an organo-silicon halide, said treated surface being resistant to the adhesion of ice under said icing conditions.

4. Apparatus adapted to be associated with an aircraft surface exposed to icing conditions for preventing accumulation of ice thereon, said apparatus comprising a flexible elastic covering of rubbery material for said surface and inflation means for distorting said covering to break ice therefrom, an exposed surface of said covering comprising a silicone, said surface being resistant to the adhesion of ice under said icing conditions.

5. Apparatus adapted to be associated with an aircraft surface exposed to icing conditions for preventing accumulation of ice thereon, said apparatus comprising a flexible elastic member formed of rubbery material arranged to be mounted on said surface and to be distorted for breaking ice therefrom, and a flexible film comprising a silicone adhering to an exposed surface of said flexible member, said film being resistant to the adhesion of ice under said icing conditions.

6. Apparatus adapted to be mounted on the leading edge of an airfoil exposed to icing conditions for preventing accumulation of ice thereon, said apparatus comprising an inflatable boot of flexible, elastic rubbery material having an exposed surface comprising a flexible elastic silicone, said surface being resistant to the adhesion of ice under said icing conditions.

7. Apparatus adapted to be mounted on the leading edge of an airfoil exposed to icing conditions for preventing accumulation of ice thereon, said apparatus comprising an inflatable boot of flexible, elastic rubbery material having an exposed surface comprising polymeric material derived from an organo-silicon halide, said surface being resistant to the adhesion of ice under said icing conditions.

8. Apparatus adapted to be mounted on the leading edge of an airfoil exposed to icing conditions for preventing accumulation of ice thereon, said apparatus comprising an inflatable boot of flexible, elastic rubbery material having an exposed surface treated with an organo-silicon halide, said surface being resistant to the adhesion of ice under said icing conditions.

9. Apparatus adapted to be mounted on the leading edge of an airfoil exposed to icing conditions for preventing accumulation of ice thereon, said apparatus comprising an inflatable boot having an exposed surface formed of flexible elastic rubbery material exteriorly coated with a flexible elastic silicone film, said coated surface being resistant to the adhesion of ice under said icing conditions.

10. Apparatus adapted to be mounted on the leading edge of an airfoil exposed to icing conditions for preventing accumulation of ice thereon, said apparatus comprising an inflatable boot having an exposed surface formed of flexible elastic rubbery material exteriorly coated with polymeric material derived from an organo-silicon halide, said coated surface being resistant to the adhesion of ice under said icing conditions.

11. Apparatus adapted to be mounted on the leading edge of an airfoil exposed to icing conditions for preventing accumulation of ice thereon, said apparatus comprising an inflatable boot having an exposed surface formed of flexible elastic rubbery material which has been surface treated with an organo-silicon halide, said treated surface being resistant to the adhesion of ice under said icing conditions.

12. Ice-removing apparatus comprising an expansible member formed of flexible elastic rubbery material, means for expanding said member to break ice therefrom, and means on an exposed surface of said member for reducing adhesion of ice thereto, the last said means comprising a flexible elastic film of polymeric silicone material produced by treating said surface with an organo-silicon halide.

13. The method of reducing the adhesion of ice to a rubbery surface of an aircraft ice-removing boot normally subjected to icing conditions which comprises applying to the said rubbery surface an organo-silicon halide, providing thereby a resulting extensible elastic film on said surface stretchable with the rubbery material and resistant to adhesion of ice under said icing conditions.

14. The method of reducing the adhesion of ice to a rubbery surface of an aircraft ice-removing boot normally subjected to icing conditions which comprises coating said rubbery surface with a silicone, providing thereby a resulting extensible elastic film on said surface stretchable with the rubbery material and resistant to adhesion of ice under said icing conditions.

15. The method of reducing the adhesion of ice to the surface of an aircraft ice-removing boot of a rubbery material normally subjected to icing conditions which comprises applying to the said surface a solution of an organo-silicon halide in a volatile solvent, and thereafter permitting the solvent to evaporate, providing thereby a resulting extensible elastic film on said surface stretchable with the rubbery material and resistant to adhesion of ice under said icing conditions.

16. The method of reducing the adhesion of ice to the surface of an aircraft ice-removing boot of rubbery material normally subjected to icing conditions which comprises applying to the said surface a solution of an organo-silicon halide in a volatile solvent selected from the class consisting of hydrocarbons and halogen-substituted hydrocarbons, and thereafter permitting the solvent to evaporate, providing thereby a resulting extensible elastic film on said surface stretchable with the rubbery material and resistant to adhesion of ice under said icing conditions.

17. The method of reducing the adhesion of ice to the surface of an aircraft ice-removing boot of a rubbery material normally subjected to icing conditions which comprises treating said rubbery surface with dimethyl silicon dichloride, providing thereby a resulting extensible elastic film on said surface stretchable with the rubbery material and resistant to adhesion of ice under said icing conditions.

18. The method of reducing the adhesion of ice to the surface of an aircraft ice-removing boot of a rubbery material normally subjected to icing conditions which comprises applying to said rubbery surface a solution comprising dimethyl silicon dichloride in a volatile solvent, and thereafter permitting the solvent to evaporate, providing thereby a resulting extensible elastic film on said surface stretchable with the rubbery material and resistant to adhesion of ice under said icing conditions.

19. The method of treating a rubber ice-removing device for an aircraft to lower the adhesion of ice thereto which comprises applying an organo-silicon halide to an exposed rubber surface of said device, providing thereby a resulting extensible elastic film on said surface stretchable with the rubbery material and resistant to adhesion of ice under said icing conditions.

20. Apparatus adapted to be associated with an aircraft surface exposed to icing conditions for preventing accumulation of ice thereon, said apparatus comprising a flexible elastic distortable element formed of rubbery material arranged to be mounted on said surface, an exposed surface of said flexible element comprising a silicone resistant to the adhesion of ice under said icing conditions.

DWIGHT L. LOUGHBOROUGH.

REFERENCES CITED

The following references are of record in the file of this patent:

UNITED STATES PATENTS

| Number | Name | Date |
|---|---|---|
| 1,890,286 | Geer | Dec. 6, 1932 |
| 1,998,809 | Geer | Apr. 23, 1935 |
| 2,258,218 | Rochow | Oct. 7, 1941 |
| 2,306,222 | Patnode | Dec. 22, 1942 |
| 2,327,034 | Geer | Aug. 17, 1943 |
| 2,439,689 | Hyde | Apr. 13, 1948 |
| 2,441,098 | Hyde | May 4, 1948 |